US007080143B2

(12) United States Patent
Hunt et al.

(10) Patent No.: US 7,080,143 B2
(45) Date of Patent: *Jul. 18, 2006

(54) SYSTEM AND METHOD PROVIDING AUTOMATIC POLICY ENFORCEMENT IN A MULTI-COMPUTER SERVICE APPLICATION

(75) Inventors: Galen C. Hunt, Bellevue, WA (US); Aamer Hydrie, Kirkland, WA (US); Steven P. Levi, Redmond, WA (US); Bassam Tabbara, Seattle, WA (US); Mark D. Van Antwerp, Redmond, WA (US); Robert V. Welland, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/843,715

(22) Filed: May 11, 2004

(65) Prior Publication Data

US 2005/0021696 A1    Jan. 27, 2005

Related U.S. Application Data

(63) Continuation of application No. 09/696,752, filed on Oct. 24, 2000, now Pat. No. 6,915,338.

(51) Int. Cl.
  *G06F 15/173* (2006.01)
(52) U.S. Cl. .................. 709/224; 709/202; 709/220; 709/223; 709/226; 370/254; 370/389; 714/39; 714/47; 719/318
(58) Field of Classification Search ............... 709/202, 709/220, 223, 224, 225, 227, 238, 226; 370/254, 370/236, 389, 469; 713/162; 707/3, 10; 714/39, 47; 718/318
See application file for complete search history.

(56) References Cited

U.S. PATENT DOCUMENTS

| 5,031,089 A | 7/1991 | Liu et al. |
| 5,220,621 A | 6/1993 | Saitoh |
| 5,430,810 A | 7/1995 | Saeki |
| 5,475,817 A | 12/1995 | Waldo et al. |
| 5,748,958 A | 5/1998 | Badovinatz et al. |
| 5,768,271 A | 6/1998 | Seid et al. |
| 5,801,970 A | 9/1998 | Rowland et al. |
| 5,826,015 A | 10/1998 | Schmidt |

(Continued)

OTHER PUBLICATIONS

Svend Frolund & Pankaj Garg, "Design-Time Simulation of a Large-Scale, Distrubuted Object System" ACM 1998, pp. 374-400.

(Continued)

*Primary Examiner*—Saleh Najjah
*Assistant Examiner*—ThuHa Nguyen
(74) *Attorney, Agent, or Firm*—Lee & Hayes PLLC

(57) ABSTRACT

Systems and methods to enforce policy in a multi-computer service application are described. The application includes multiple software modules that execute on multiple computers. The multi-computer service application has access to a communications medium that allows data communications between different ones of the computers. The software modules have logical input and output ports and logical data connections between modules. Each logical port is defined by port software. In one aspect, a particular module sends a notification to a policy module. Responsive to the notification, the policy module (a) determines a request for one or more destination modules, and (b) provides the request to an output port of the policy module. The output port forwards the request to input ports of a plurality of the modules in accordance with the logical data connections.

21 Claims, 11 Drawing Sheets

U.S. PATENT DOCUMENTS

| | | | |
|---|---|---|---|
| 5,872,914 A | 2/1999 | Walker, Jr. et al. | |
| 5,895,499 A | 4/1999 | Chu | |
| 5,948,055 A * | 9/1999 | Pulsipher et al. | 709/202 |
| 5,960,371 A | 9/1999 | Saito et al. | |
| 6,047,325 A * | 4/2000 | Jain et al. | 709/227 |
| 6,070,243 A | 5/2000 | See et al. | |
| 6,108,699 A | 8/2000 | Moiin | |
| 6,111,993 A | 8/2000 | Matsunaga | |
| 6,125,447 A | 9/2000 | Gong | |
| 6,141,749 A * | 10/2000 | Coss et al. | 713/162 |
| 6,151,688 A | 11/2000 | Wipfel et al. | |
| 6,178,529 B1 | 1/2001 | Short et al. | |
| 6,192,401 B1 | 2/2001 | Modiri | |
| 6,208,345 B1 | 3/2001 | Sheard et al. | |
| 6,212,559 B1 | 4/2001 | Bixler et al. | |
| 6,259,448 B1 | 7/2001 | McNally et al. | |
| 6,263,089 B1 | 7/2001 | Otsuka | |
| 6,266,707 B1 | 7/2001 | Boden et al. | |
| 6,311,144 B1 | 10/2001 | Abu El Ata | |
| 6,324,571 B1 | 11/2001 | Hacherl | |
| 6,336,171 B1 | 1/2002 | Coskrey, IV | |
| 6,338,112 B1 | 1/2002 | Wipfel et al. | |
| 6,353,898 B1 | 3/2002 | Wipfel et al. | |
| 6,360,265 B1 * | 3/2002 | Falck et al. | 709/227 |
| 6,366,578 B1 | 4/2002 | Johnson | |
| 6,389,464 B1 | 5/2002 | Krishnamurthy et al. | |
| 6,393,456 B1 | 5/2002 | Ambler et al. | |
| 6,393,474 B1 * | 5/2002 | Eichert et al. | 709/223 |
| 6,427,163 B1 | 7/2002 | Arendt et al. | |
| 6,449,641 B1 | 9/2002 | Moiin et al. | |
| 6,466,932 B1 * | 10/2002 | Dennis et al. | 707/3 |
| 6,466,978 B1 * | 10/2002 | Mukherjee et al. | 709/225 |
| 6,466,984 B1 | 10/2002 | Naveh et al. | |
| 6,470,332 B1 | 10/2002 | Weschler | |
| 6,480,955 B1 | 11/2002 | DeKoning et al. | |
| 6,484,261 B1 | 11/2002 | Wiegel | |
| 6,487,622 B1 | 11/2002 | Coskrey, IV et al. | |
| 6,493,715 B1 * | 12/2002 | Funk et al. | 707/10 |
| 6,496,187 B1 | 12/2002 | Deering et al. | |
| 6,510,154 B1 | 1/2003 | Mayes et al. | |
| 6,510,509 B1 | 1/2003 | Chopra et al. | |
| 6,529,953 B1 | 3/2003 | Van Renesse | |
| 6,549,516 B1 * | 4/2003 | Albert et al. | 370/236 |
| 6,564,261 B1 | 5/2003 | Gudjonsson et al. | |
| 6,584,499 B1 | 6/2003 | Jantz et al. | |
| 6,587,876 B1 * | 7/2003 | Mahon et al. | 709/223 |
| 6,598,173 B1 | 7/2003 | Sheikh et al. | |
| 6,606,708 B1 | 8/2003 | Devine et al. | |
| 6,609,148 B1 | 8/2003 | Salo et al. | |
| 6,609,213 B1 | 8/2003 | Nguyen et al. | |
| 6,615,256 B1 | 9/2003 | van Ingen et al. | |
| 6,631,141 B1 * | 10/2003 | Kumar et al. | 370/469 |
| 6,651,101 B1 * | 11/2003 | Gai et al. | 709/224 |
| 6,684,335 B1 | 1/2004 | Epstein, III et al. | |
| 6,691,168 B1 | 2/2004 | Bal et al. | |
| 6,694,436 B1 | 2/2004 | Audebert | |
| 6,717,949 B1 | 4/2004 | Boden et al. | |
| 6,718,379 B1 * | 4/2004 | Krishna et al. | 709/223 |
| 6,728,885 B1 | 4/2004 | Taylor et al. | |
| 6,748,447 B1 * | 6/2004 | Basani et al. | 709/244 |
| 6,754,716 B1 | 6/2004 | Sharma et al. | |
| 6,769,008 B1 | 7/2004 | Kumar et al. | |
| 6,801,528 B1 * | 10/2004 | Nassar | 370/389 |
| 6,801,937 B1 | 10/2004 | Novaes et al. | |
| 6,804,148 B1 | 10/2004 | Wesinger et al. | |
| 6,820,121 B1 * | 11/2004 | Callis et al. | 709/225 |
| 6,862,613 B1 | 3/2005 | Kumar et al. | |
| 2001/0019554 A1 | 9/2001 | Nomura et al. | |
| 2002/0095524 A1 * | 7/2002 | Sanghvi et al. | 709/318 |
| 2002/0194369 A1 * | 12/2002 | Rawlins et al. | 709/238 |
| 2003/0041139 A1 * | 2/2003 | Beadles et al. | 709/223 |
| 2003/0120763 A1 * | 6/2003 | Volpano | 709/223 |
| 2003/0126230 A1 | 7/2003 | Donatelli et al. | |
| 2003/0154404 A1 | 8/2003 | Beadles et al. | |
| 2003/0206548 A1 | 11/2003 | Bannai et al. | |
| 2004/0054791 A1 | 3/2004 | Chakraborty et al. | |
| 2004/0078787 A1 | 4/2004 | Borek et al. | |

OTHER PUBLICATIONS

Smith, Robin, Griffiths, David G.; "Distributed management of Future Global Multi-Service Networks" British Telecommunications Engineering, v13, part 3, London, UK, Oct. 1994 pp. 221-226.

Somers, Fergal; "Hybrid: Unifying Centralised and Distributed Network Management using Intelligent Agents" IEEE Network Operations and Management Symposium, Kyoto Japan, Apr. 1996, v 1, syposium 5, pp. 34-43.

Webster's Seventh New Collegiate Dictionary, G.C. Merriam Co. Copyright 1971, pp. 438 & 767.

Li, Hsiang-Ling, Chakrabarti, Chaitali; "Hardware Design of a 2-D Motion Estimation System Based on the Hough Transform" IEEE 1998; 16 pages.

* cited by examiner

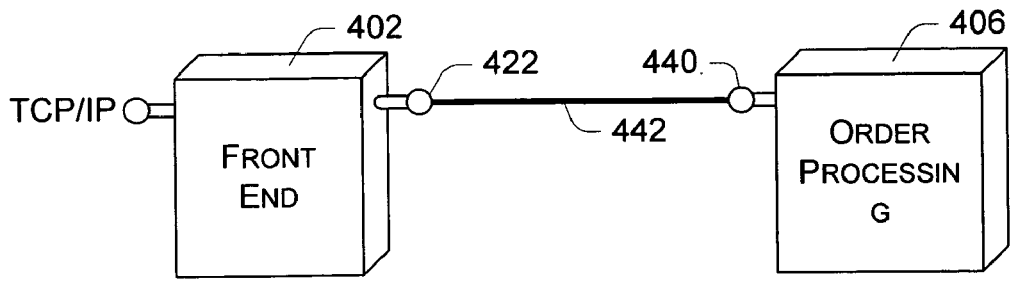
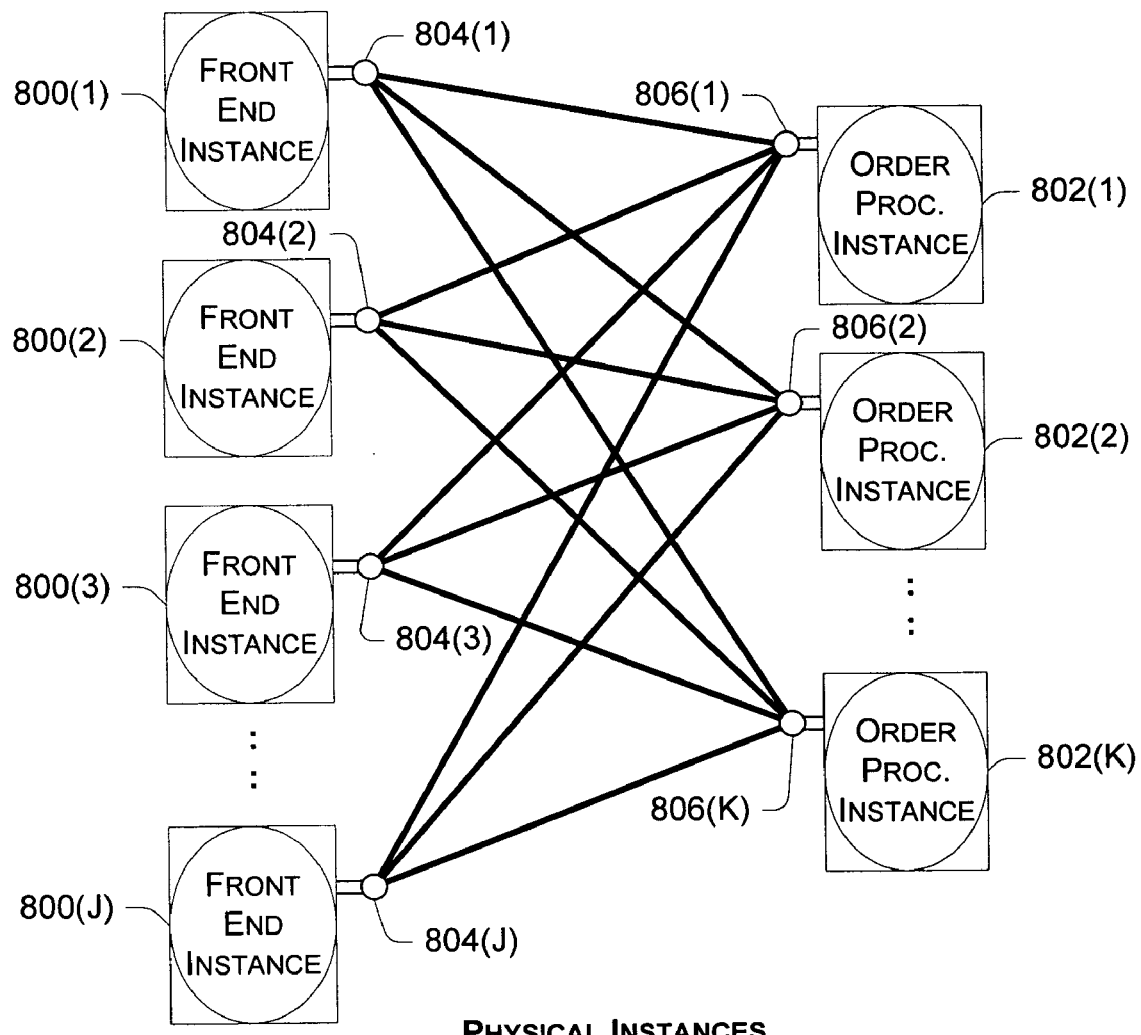
Fig. 8

Module Table

| Instance ID | Model Component | Node ID | S/W Type | S/W ID | ID of Port(s) | Protocol |
|---|---|---|---|---|---|---|
| A | Front End | 123 | FE, Ver. 3.1 | K123 | A1, A2, A3 | HTTP, TCP |
| B | Front End | 332 | FE, Ver. 3.1 | K124 | B1, B2, B3 | HTTP, TCP |
| .. | .. | .. | .. | .. | .. | .. |
| ZA | Order Proc. | 14 | OP, Ver. 1.4 | 3B58 | ZA1, ZA2 | HTTP |
| ZB | Order Proc. | 854 | OP, Ver. 1.4 | 3B59 | ZB1, ZB2 | HTTP |

902

Port Table

| Port ID | Model Component | Node ID | Network Address | Instance ID | Protocol | Wire ID |
|---|---|---|---|---|---|---|
| A1 | FE Port | 123 | Port 80 | A | HTTP | W115 |
| .. | .. | .. | .. | .. | .. | .. |

904

Wire Table

| Wire ID | Model Component | Node ID | Port ID | Instance ID | Protocol |
|---|---|---|---|---|---|
| W115 | FE-TO-OP Wire | 123 | A2 | A | SOAP |
|  |  | 14 | ZA1 | ZA |  |
| .. | .. | .. | .. | .. | .. |

SYSTEM AND METHOD PROVIDING AUTOMATIC POLICY ENFORCEMENT IN A MULTI-COMPUTER SERVICE APPLICATION

RELATED APPLICATIONS

This application is a continuation of U.S. patent application Ser. No. 09/696,752, filed on Oct. 24, 2000, now U.S. Pat. No. 6,915,338 titled "System and Method Providing Automatic Policy Enforcement in a Multi-Computer Service Application."

TECHNICAL FIELD

This invention relates to distributed computer systems, such as server data centers or Websites. More particularly, this invention pertains to a way to automatically enforce a policy in a multi-computer service application.

BACKGROUND

It is no secret that Internet usage has exploded over the past few years and continues to grow rapidly. People have become very comfortable with many services offered on the World Wide Web (or simply "Web"), such as electronic mail, online shopping, gathering news and information, listening to music, viewing video clips, looking for jobs, and so forth. To keep pace with the growing demand for Internet-based services, there has been tremendous growth in the computer systems dedicated to hosting Websites, providing backend services for those sites, and storing data associated with the sites.

One type of distributed computer system is an Internet data center (IDC), which is a specifically designed complex that houses many computers for hosting Internet-based services. IDCs, which also go by the names "Webfarms" and "server farms", typically house hundreds to thousands of computers in climate-controlled, physically secure buildings. These computers are interconnected to run one or more programs supporting one or more Internet services or Websites. IDCs provide reliable Internet access, reliable power supplies, and a secure operating environment.

FIG. 1 shows an Internet data center 100. It has many server computers 102 arranged in a specially constructed room. The computers are general-purpose computers, typically configured as servers. An Internet data center may be constructed to house a single site for a single entity (e.g., a data center for Yahoo! or MSN), or to accommodate multiple sites for multiple entities (e.g., an Exodus center that host sites for multiple companies).

The IDC 100 is illustrated with three entities that share the computer resources: entity A, entity B, and entity C. These entities represent various companies that want a presence on the Web. The IDC 100 has a pool of additional computers 104 that may be used by the entities at times of heavy traffic. For example, an entity engaged in online retailing may experience significantly more demand during the Christmas season. The additional computers give the IDC flexibility to meet this demand.

While there are often many computers, the Internet service or Website may only run a few programs. For instance, one Website may have 2000–3000 computers that run only 10–20 pieces of software. Computers can be added daily to provide scalability as the Website receives increasingly more visitors, but the underlying programs change less frequently. Rather, there are simply more computers running the same software in parallel to accommodate the increased volume of visitors.

Managing the physical resources of an Internet service is difficult today. Decisions such as when to add (or remove) computers to carry out functionality of the Internet service are made by human operators. Often, these decisions are made based on the operators' experience in running the Internet service. Unfortunately, with the rapid growth of services, there is a shortage of qualified operators who can make real-time decisions affecting the operation of a Website. Accordingly, it would be beneficial if some of the managerial, or policy aspects of running a Internet service could be automated.

Today, there is no conventional way to automate policy aspects of running an Internet service in a way that abstracts the functionality of the policy from the underlying physical deployment of the application. Perhaps this is because the industry has grown so fast that everyone's focus has been simply to keep up with the exploding demand by adding computers to Website applications. Not much thought has gone into how to model a policy mechanism that is scale-invariant.

At best, most distributed applications rely on human intervention and/or manual control for: (a) installing application components, (b) configuring the components, (c) monitoring the health of the overall application and individual components, and (d) taking reactive measures to maintain good overall application and component health. Where these tasks are automated, they operate in context of isolated physical components, without a big picture of how the components of the application relate to one another.

The downside with such traditional procedures to implementing policy is that Website operators must maintain constant vigilance over the operation of the application. Upon detecting a change in the application's operation that is contrary to the overall health of the application, Website operators are typically required to consult one or more documents that essentially detail the actions the Web Operators should take upon the occurrence of the condition. Moreover, such documents must continually be updated as the Website grows in physical resources and/or as the policy changes. Accordingly, it would be beneficial if some of the managerial, or policy aspects of running an Internet service could be automated.

SUMMARY

Systems and methods to enforce policy in a multi-computer service application are described. The application includes multiple software modules that execute on multiple computers. The multi-computer service application has access to a communications medium that allows data communications between different ones of the computers. The software modules have logical input and output ports and logical data connections between modules. Each logical port is defined by port software. In one aspect, a particular module sends a notification to a policy module. Responsive to the notification, the policy module (a) determines a request for one or more destination modules, and (b) provides the request to an output port of the policy module. The output port forwards the request to input ports of a plurality of the modules in accordance with the logical data connections.

BRIEF DESCRIPTION OF THE DRAWINGS

FIG. 8 illustrates a translation of the logical model into real-world instances.

FIG. 9 illustrates exemplary data records of an instance database used to store the real-world instances.

DETAILED DESCRIPTION

Figure 1:
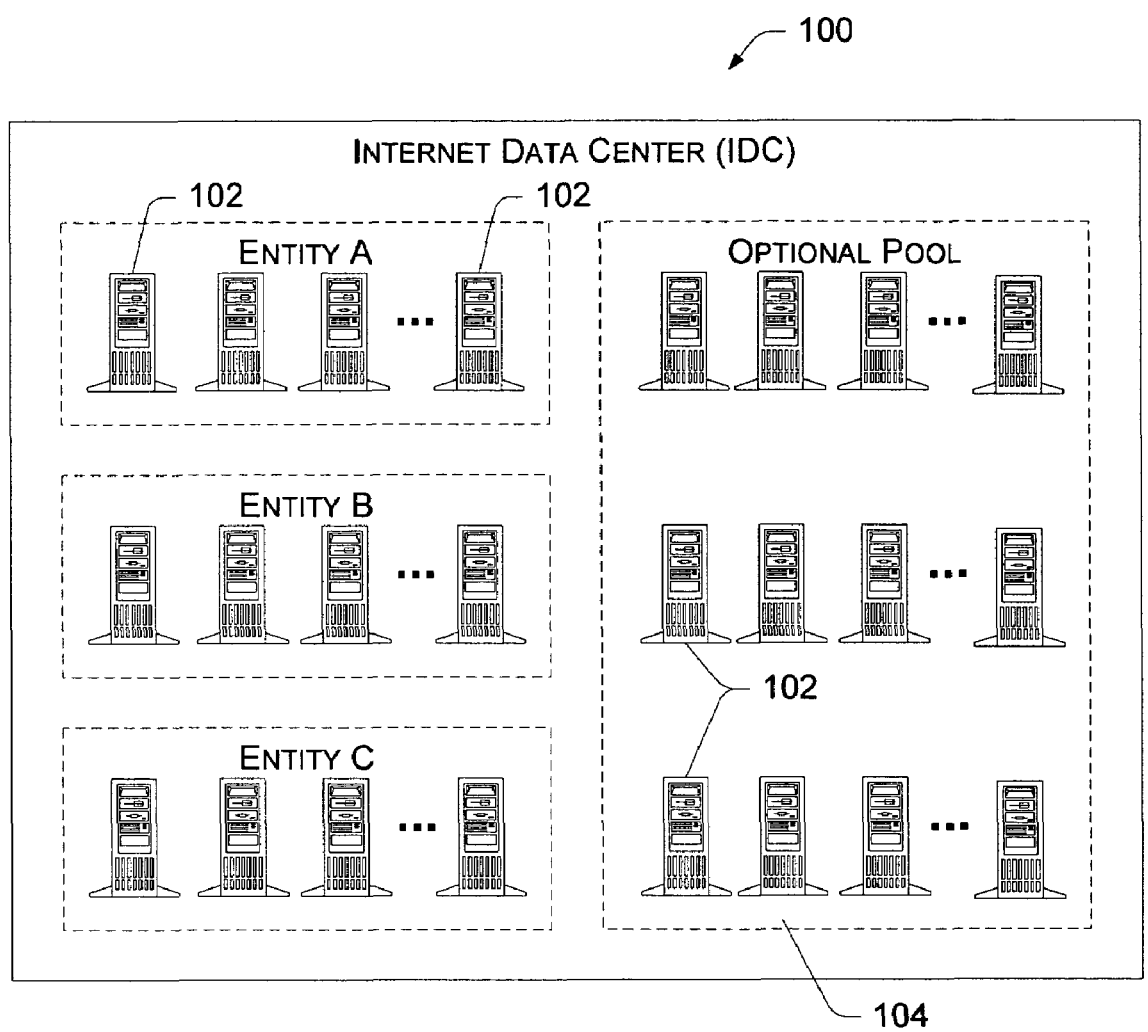
FIG. 1 illustrates a conventional Internet data center (IDC).

A system and procedure to automatically enforce policy in a multi-computer service application includes a modeling system and a deployment system. The modeling system permits developers of applications for distributed computer systems (e.g., server data centers, Internet data centers (IDCs), Web farms, and the like) to architect the hardware and software in an abstract manner. The modeling system defines a set of components used to describe the functionality of an application in a logical, scale-independent manner. An "application" within this context refers to an entire service hosted on the distributed computer system.

For instance, an Internet data center may host a Website for an online retailer, where the application entails the entire software and hardware configuration that implements the online retailer's Internet presence. The application might include, for example, a front end to handle client requests, an order processing system, a billing system, an inventory system, a database system, and a policy module to respond to changes in the operation of the application.

The model components are arranged and interconnected to form a scale-independent model of the application. Each component specifies some functionality of the application. The model can then be used to construct a scalable physical blueprint in terms of which machines run which pieces of software to form the application.

The deployment system uses the logical model to deploy various computer/software resources in real-time as the applications need them. The deployment system converts each of the model components into one or more instances that correspond to physical resources. The deployment system tracks the instances and all available resources. The deployment system decides when resources should be added (or removed) and monitors the current state of implementation. The deployment system installs the application and then dynamically and automatically modifies the resources used to implement the application in an ongoing basis as the operating parameters of the application change.

One of the components deployed by the deployment system is a policy module. The policy module is one of the model components in the logical model. The policy module responds to changes in the operation of the application by enforcing a policy. The policy module receives notifications from the deployed resources. In response to receiving such notifications, the policy module evaluates the notifications against a policy, which results in one or more of data, a request, or notification being sent to one or destination resources according to the configured logical data connections.

The system is described in the context of Website designs, such as applications for Internet data centers. However, the design system may be implemented to model other large size and scalable applications for computer systems. Accordingly, the design system can be implemented in a wide variety of ways, including Internet-based implementations and non-Internet-based implementations.

Model Components and Schema

The modeling system defines several model components that form the building blocks of a logical, scale-independent application: a module, a port, and a wire. It also defines a set of model extensions including, but not limited to: a store, an event source, an event sink, and an event path. In a design tool, the components are represented pictorially as graphical elements or symbols that may be arranged and interconnected to create scale-independent models of Website applications. The graphical elements have an associated schema that dictates how the functional operations being represented by the graphical elements are to be specified.

Figure 2:
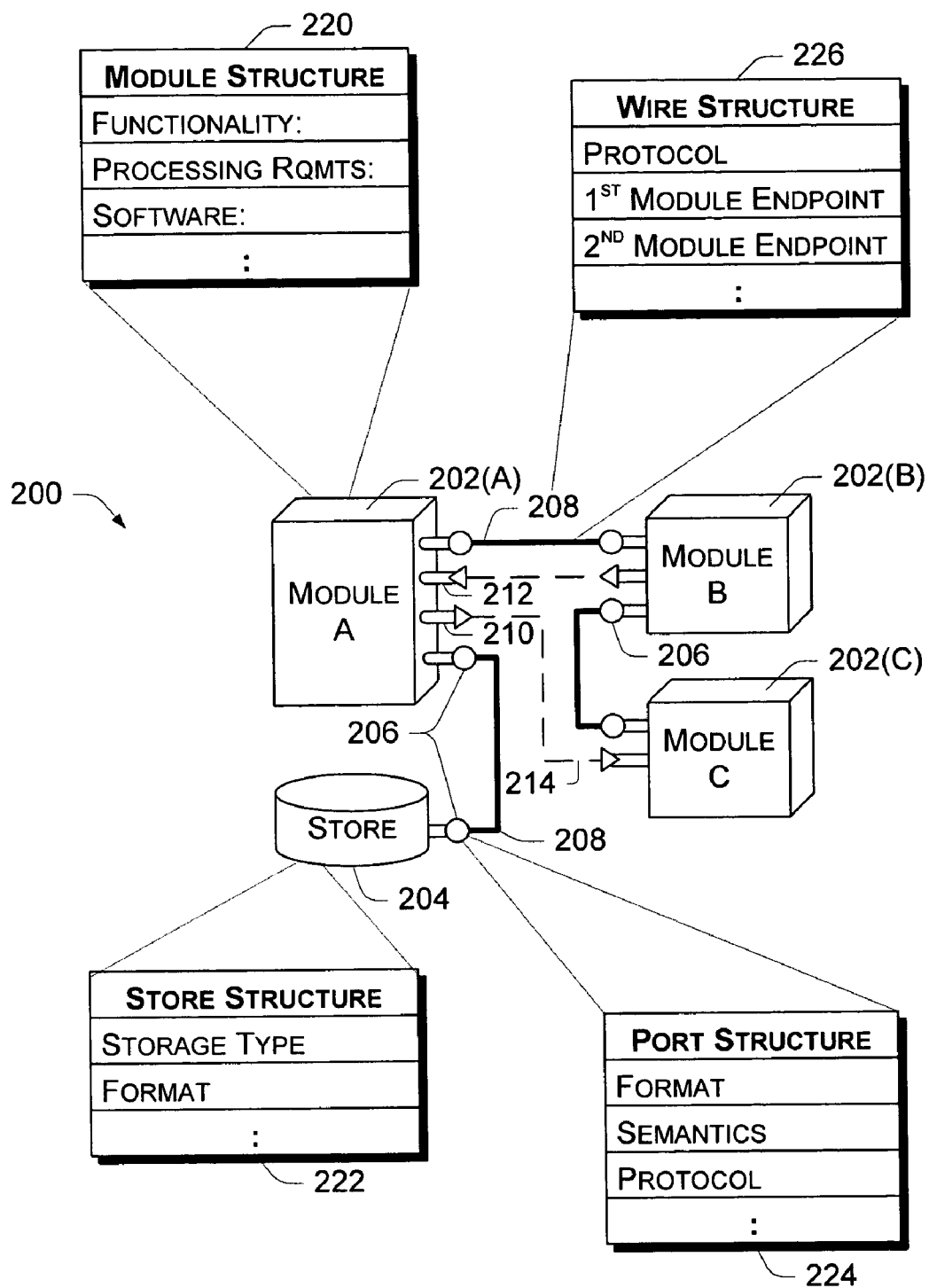
FIG. 2 illustrates a set of model components that form the building blocks for modeling an application, along with the associated schema.

FIG. 2 illustrates a set of model components 200 that a module, as represented by modules 202(A)–202(C), a store 204, ports 206, wires 208, event sources 210, event sinks 212, and event paths 214. The components 200 are arranged in a no particular manner other than to foster discussion of their individual traits.

A module 202 represents a basic unit of functionality for the application and is depicted as a block. It is a logical entity that represents some portion of the application as implemented at the IDC, but has no physical manifestation. The module often corresponds to a software program that handles a logical set of tasks for the application. For instance, one module might represent a front end for a Website, another module might represent a login database, and another module might represent an electronic mail program.

Each module 202 is a container of behavior. A simple module is atomic and has associated a unique identifier. Modules can be nested into a hierarchy of modules to form more complex behaviors. In a module hierarchy, the leaf modules are simple modules, and the non-leaf modules are compound modules.

Each module 202 defines a unit of scaling. While one module logically represents a functional operation of the application, the module may translate to any number of computers when actually implemented. In this way, the module is scale-independent, allowing the number of underlying computers used to implement the module to change at any time. When converted to a physical implementation, "instances" are created from the modules. The module instances are assigned a unique identifier and maintain ancestral data regarding which module created them. The instances of simple modules are called "engines", which correspond to software programs that run on individual computer nodes.

A store 204 is the most basic unit of storage and is depicted graphically as a disk storage icon. It represents a logical partitioning, which may be implemented by any number of physical disks or other storage media.

A port 206 is a service access point for a module 202 or store 204 and is depicted as spherical knobs projecting from the module or store. All service-related communications into and out of the module go through the port 206. Each port 206 has a "type", which is a set of attributes describing format, semantics, protocol, and so forth. At runtime, the port represents a set of physical ports associated with the instantiated engines of the modules.

A wire 208 is the logical binding that defines a communication route between two ports 206 and is depicted as a bold line. Each wire 208 can be type-checked (i.e., protocols, roles) and defines protocol configuration constraints (e.g., HTTP requires TCP, TCP requires IP, etc.).

Event sources 210 and event sinks 212 are used for discrete semantic messaging between modules and stores. An event source 210 is pictorially shown as a triangle pointing away from the module or store, while an event sink 212 is depicted as a triangle pointing toward the module or store. An event path 214 is a logical connection between sources and sinks, and carries event messages used to inform modules/stores and implement policy (e.g., scaling, fail-over, monitoring, application processes, etc.). It is depicted as a dashed line.

FIG. 2 also illustrates the schema underlying the graphical elements as exemplary data structures associated with the model components. Module 202(A) has an associated structure 220 that contains various characteristics for the module, such as functionality, processing requirements, software, and so forth. Thus, a module for a database server function might have characteristics pertaining to the kind of database (e.g., relational), the data structure (e.g., tables, relationships), software (e.g., SQL), software version, and so forth. Modules 202(B) and 202(C) have similar structures (not shown).

The store 204 has a corresponding structure 222 that defines the requirements for storage. The store schema structure 222 might include, for example, the kind of storage (e.g., disk), the storage format, and so on. Each port 206 has a schema structure, as represented by structure 224, which dictates the port's type. Each wire 208 also is also associated with a structure, such as structure 226, which outlines the protocols implemented by the connection. Similar schema structures may also be provide for event sources, event sinks, and paths.

Using the model components, an application developer can logically configure scale-independent applications prior to physically laying them out in the Internet data centers. The developer drafts a model using a user interface to select and interconnect the model components. Once constructed, the modeling software generates the application based on the depicted model and the underlying schema. The application may subsequently be converted into a physical blueprint that details the computers and software needed to implement the application for a specified number of client visitors.

The scale-invariant nature of the modeling system allows application developers to focus only on designing software for a specific functional task (e.g., front end, login database, email program, etc.). All external communications can then be expressed in terms of transmitting to and receiving from one or more associated ports. In this manner, the application developers need not worry about how many machines will be used to run the module, or how other modules of the scale-independent application are being configured.

Exemplary Module and Application

Figure 3:
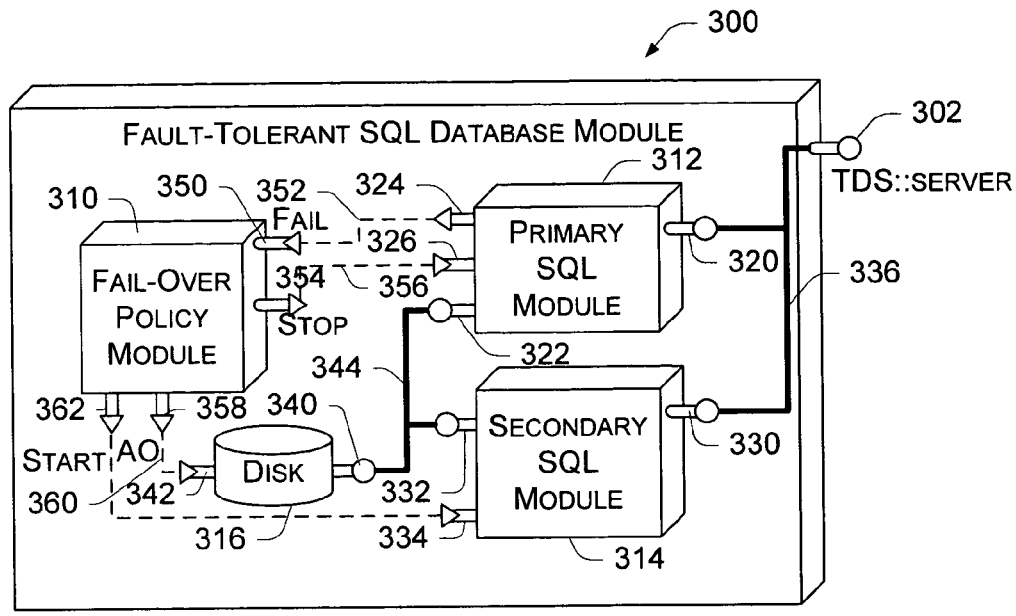
FIG. 3 illustrates a database application for an IDC that is modeled in terms of the components.

FIG. 3 shows a fault-tolerant SQL (structure query language) database module 300 to demonstrate how the model components may be organized and connected to represent a portion of an application. In this example, the database module 300 represents a SQL database that may be used independently or as a component in a larger application. The SQL database module 300 has a module interface composed of a single port 302 that implements a TDS (Tabular Data Stream) protocol.

The SQL database module 300 is a compound module made up of three simple modules: a fail-over policy module 310, a primary SQL module 312, and a secondary SQL module 314. The primary and secondary SQL modules represent dual programs that operate in parallel so that, in the event that the primary module 312 crashes, the secondary module 314 can assume the role without loss of service. The database module 300 also has a data store 316 that represents the memory storage for the SQL database module.

The primary SQL module 312 has a module interface that includes a first port 320 for communicating with the compound module port 302 and a second port 322 for communicating with the store 316. The primary SQL module 312 also has an event source 324 and an event sink 326 for handling event messages from the fail-over policy module 310. Similarly, the secondary SQL module 314 has a module interface with a first port 330 for communicating with the compound module port 302, a second port 332 for communicating with the store 316, and an event sink 334 for receiving events from the fail-over policy module 310. A wire 336 interconnects the external compound module port 302 with the ports 320 and 330 of the primary and secondary SQL modules, respectively.

The store 316 has a port 340 to communicate with the primary and secondary SQL modules 312 and an event sink 342 to receive event messages from the fail-over policy module 310. A wire 344 interconnects the store port 340 with the ports 322 and 332 of the primary and secondary SQL modules, respectively.

The fail-over policy module 310 has a module interface that includes three event sources and one event sink. An event sink 350 receives a "fail" event from the event source 324 of the primary SQL module 312 via an event path 352 when the primary SQL module experiences some failure. In response to receiving a "fail" event, the fail-over policy module 310 concurrently issues a first event to stop the failed primary module 312, another event to assign the secondary module 314 as the new owner of the store 316, and a third event to start the secondary module 314. The "stop" event is issued via an event source 354 over an event path 356 to the event sink 326 of the primary SQL module 312. The "stop" event directs the primary SQL module 312 to halt operation.

The fail-over policy module 310 issues an "assign owner" (AO) event from an event source 358, over the event path 360 to the event sink 342 of the store 316. The assign owner event directs the storage mechanisms to switch to allowing access by the secondary SQL module 314, rather than the primary SQL module 312. The fail-over policy module 310 also issues a "start" event from event source 362 over event path 364 to the event sink 334 of the secondary module 314.

The start event directs the secondary SQL module to start operation in place of the primary SQL module.

The SQL database module 300 illustrates how the model components—modules, stores, ports, wires, sources, sinks, and paths—may be arranged and interconnected to form a complex module. The developer specifies the characteristics associated with each component according to the prescribed schema. The complex module may in turn be added to other simple or complex modules to form other complex modules. Eventually, the largest complex module becomes the application, which may then be used to form a blueprint for constructing the data center.

Figure 4:
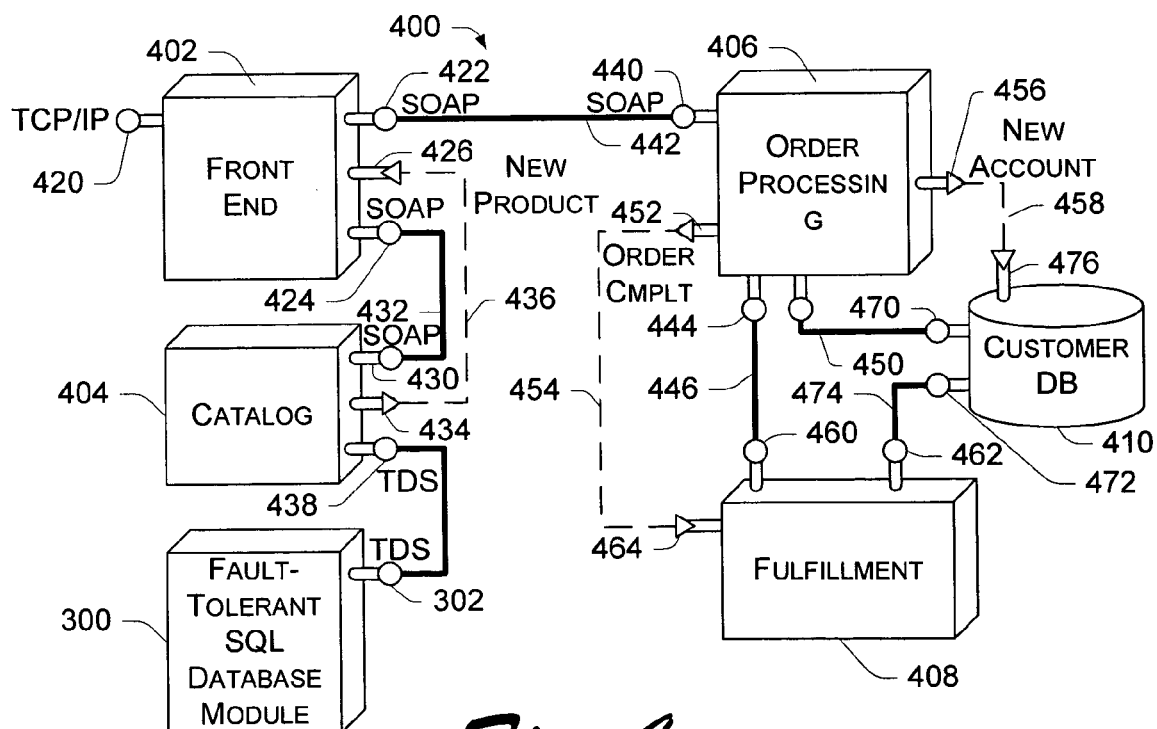
FIG. 4 illustrates an Internet-based email application for an IDC.

FIG. 4 shows a simplified application 400 for an online retailer. The application 400 includes a front end module 402, a catalog module 404, an order processing module 406, and a fulfillment module 408. The application 400 also includes a customer database 410 and the fault-tolerant SQL database module 300. Notice that the SQL database module 300 is the same as that shown in FIG. 3 to illustrate how complex modules can be nested into even greater complex modules to form an application.

The front end module 402 handles requests from clients who wish to shop with the online retailer. The front end module 402 has a port 420 that accommodates communications with external clients using the TCP/IP protocol over the Internet. The front end module 402 also has an order port 422 to define a communication exchange with the order processing module 406 and a catalog port 424 for communication flow to the catalog module 404. The ports 422 and 424 may be configured according to any of a variety of types, which support any one of a number of protocols including SOAP, TCP, or UDP. An event sink 426 is also provided to receive a "new product" message from the catalog module 404 when a new product has been added to the catalog.

The catalog module 404 provides catalog information that may be served by the front end to the requesting clients. The catalog module 404 has a front end port 430 connected via a wire 432 to the catalog port 424 of the front end module 402. The front end port 430 has a type that matches the catalog port 424. The catalog module 404 also has an event source 434 that for communicating the "new product" messages over path 436 to the event sink 426 of the front end module 402.

A SQL port 438 interfaces the catalog module 404 with the SQL database module 300. The SQL port 438 has a type that utilizes the TDS protocol for the communication exchange with the external port 302 of the SQL database 300.

The order processing module 406 has a front end port 440 to define a communication interface with the front end module 402 via a wire 442. The order processing module 406 also has a fulfillment port 444 to facilitate communication with the fulfillment module 408 over wire 446 and a database port 448 to facilitate communication with the customer database 410 via wire 450.

An event source 452 is provided at the order processing module 406 to pass "order complete" events to the fulfillment module 408 via path 454. These events inform the fulfillment module 408 that an order is complete and ready to be filled. A second event source 456 passes "new account" events to the customer database 410 via path 458 whenever a new customer orders a product.

The fulfillment module 408 has an order port 460 to provide access to the wire 446 to the order processing module 406 and a database port 462 to interface with the customer database 410. The fulfillment module 408 also has an event sink 464 to receive the "order complete" events from the order processing module 406.

The customer database 410 has an order port 470 to provide access to wire 450 and a fulfillment port 472 to facilitate communication with the fulfillment module 408 via wire 474. The customer database 410 further has an event sink 476 to receive the "new account" events from the order processing module 406.

The modeling approach illustrated in FIGS. 3 and 4 is tremendously beneficial because it allows developers and IDC operators to view the entire operation in terms of abstract functional pieces that are scale-independent. The online retailer application 400, for example, requires a front end unit, a catalog unit, an order processing unit, and a fulfillment unit regardless of whether the retailer is handling 100 hits a day or 10 million hits per day.

The scale-independent nature frees the developer to focus on his/her little piece of the application. For instance, a developer assigned the task of building the front end module 402 need only be concerned with writing software code to facilitate response/reply exchanges. Any communication to and from the module is defined in terms of order-related data being passed to the order processing module 406 via the order port 422 and product data being received from the catalog module 404 via the catalog port 424. The developer defines the data flow to and from the order port 422 and the catalog port 424 according to their respective associated protocol types.

The application 400 can then be used to construct a computer system that hosts the online retailer. Initially, the online retailer may not receive very much traffic, especially if launched away from the Christmas season. So, perhaps the front end module 402 translates initially to only a few computers to handle the light traffic from the Internet. But, suppose that over time the site becomes more popular and the Christmas season is fast approaching. In this situation, the online retailer may authorize the IDC operator to add many more computers for the front end tasks. These computers are equipped the software and configured to accept HTTP requests for product information and to serve Web pages containing the product information. The computers are added (or removed) as needed, without altering the basic application 400.

Computer-Based Modeling System and Method

Figure 5:
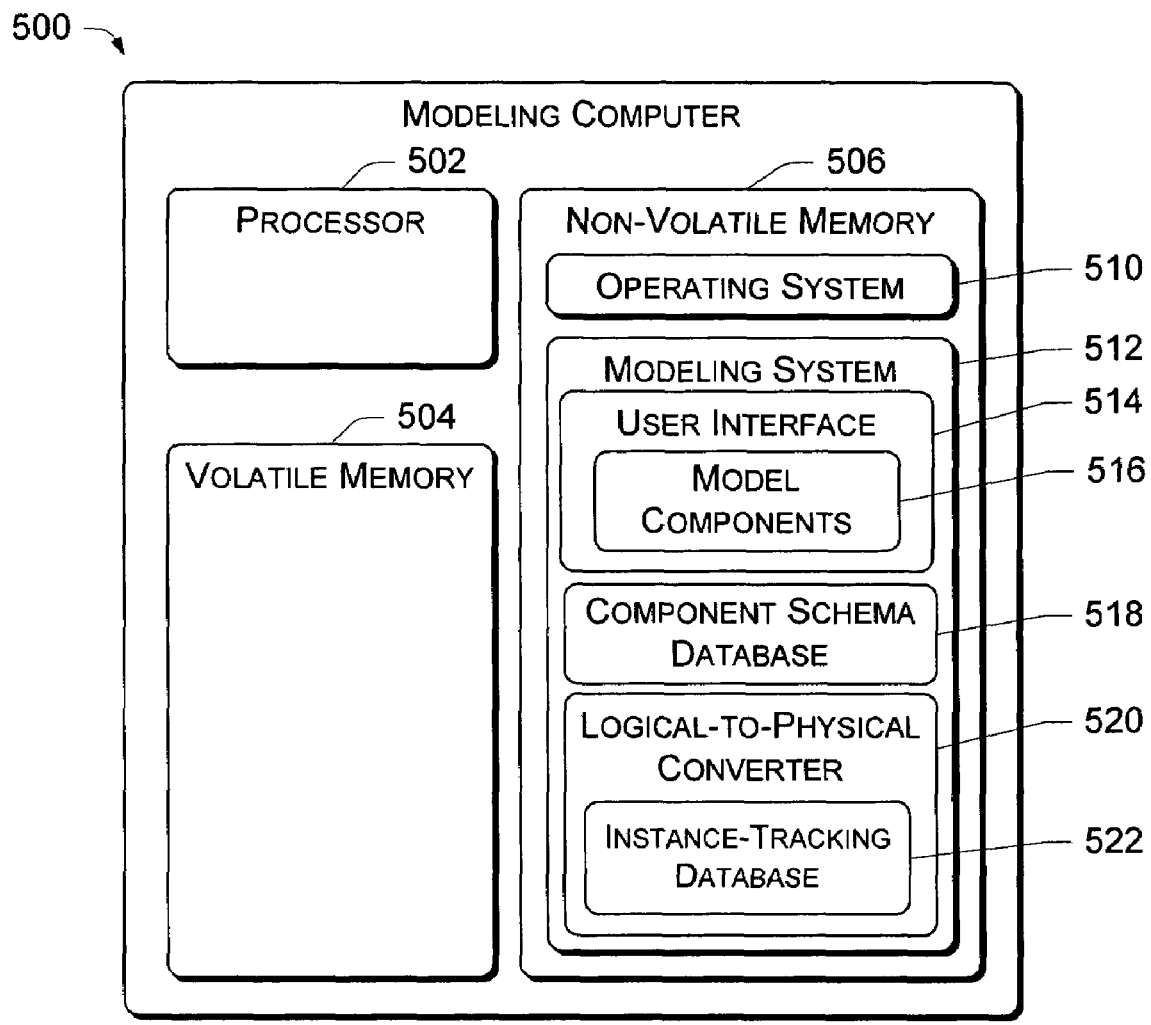
FIG. 5 is a block diagram of a computer that may be used to implement the modeling software for modeling the IDC.

FIG. 5 shows an exemplary computer system 500 that implements modeling software used to design Website applications. The modeling computer may be implemented as one of the nodes in a Website, or as a separate computer not included as one of the nodes. The modeling computer has a processor 502, volatile memory 504 (e.g., RAM), and non-volatile memory 506 (e.g., ROM, Flash, hard disk, optical, RAID memory, etc.). The modeling computer 500 runs an operating system 510 and modeling system 512.

For purposes of illustration, operating system 510 and modeling system 512 are illustrated as discrete blocks stored in the non-volatile memory 506, although it is recognized that such programs and components reside at various times in different storage components of the computer 500 and are executed by the processor 502. Generally, these software components are stored in non-volatile memory 506 and from there, are loaded at least partially into the volatile main memory 504 for execution on the processor 502.

The modeling system 512 includes a user interface 514 (e.g., a graphical UI) that presents the pictorial icons of the model components 516 (e.g., modules, ports, sources, sinks, etc.), a component schema database 518, and a logical-to-physical converter 520. The modeling system 512 allows a developer to design an application for an IDC by defining modules, ports, and event message schemes. The user interface 514 presents symbols of the components 516, such as the symbols shown in FIGS. 2–4, and permits the developer to arrange and interconnect them. The UI 514 may even support conventional UI techniques as drag-and-drop operations.

The symbols depicted on the screen represent an underlying schema 518 that is used to define the model. For instance, a block-like module symbol is associated with the characteristics of the functionality that the module is to represent in the application. Thus, the developer may define a database module that has characteristics pertaining to the kind of database (e.g., relational), the data structure (e.g., tables, relationships), software (e.g., SQL), software version, and so forth. Accordingly, by drafting the model on the UI, the developer is architecting the entire schema that will be used to design the scale-independent application.

Once the application is created, the logical-to-physical converter 520 converts the application to a physical blueprint that details the number of computers, software components, physical ports, and so forth. The converter takes various parameters—such as how many site visitors are expected, memory requirements, bandwidth requirements, processing capabilities, and the like—and scales the application according to the schema 518 represented by the application. The converter 520 specifies the number of computers needed to implement each module, the number of disks to accommodate the stores, and the types of communications protocols among the modules and stores.

In this manner, the modeling system changes the development effort from a node-centric approach to architecting IDCs to an application-centric approach. Within conventional node-centric methodology, the focus was on the computers and how they were laid out. The application was then loaded onto the nodes in a somewhat ad hoc manner. With the new application-centric approach, the focus is initially on the application itself. The physical nodes used to implement the application are derived once the application is specified.

Figure 6:
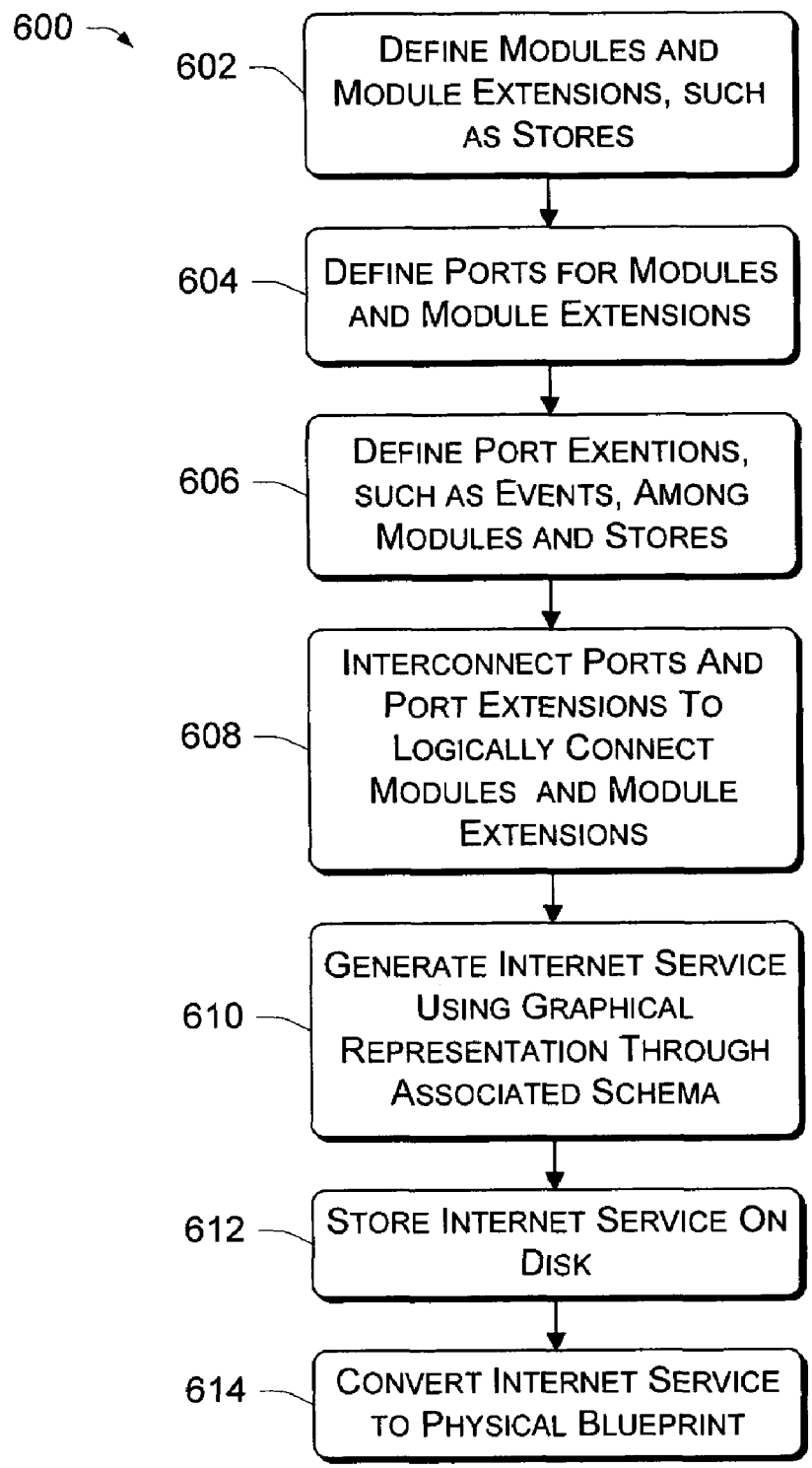
FIG. 6 is a flow diagram of a process for modeling an IDC.

FIG. 6 shows a method for modeling a scale-independent application for an Internet data center. The method 600 may be implemented, for example, by the modeling system 512 executing on the modeling computer 500. In such an implementation, the method is implemented in software that, when executed on computer 500, performs the operations illustrated as blocks in FIG. 6.

At block 602, the modeling system 512 allows the developer to define the modules and stores that form the functional elements of the applications. The UI 514 enables the developer to create modules and stores and to define their characteristics as prescribed by a predetermined schema. This entry process begins to construct the logical building blocks of the application.

At block 604, the modeling system 512 enables the developer to define the ports for the modules and stores. The developer selects the type of ports and ensures compatibility of ports that are connected to one another. At block 606, the developer also defines any events that may be passed among modules and stores. The developer creates event sources and event sinks to accommodate the various events. At block 608, the developer uses the modeling system 512 to interconnect the ports with wires and the event sources/sinks with event paths. By joining the various modules and stores, the developer effectively forms a logical representation of the application.

At block 610, the modeling system 512 generates an application using the graphical representation constructed by the developer. The modeling system 512 generates the logical specifications associated with the graphical model, including the characteristics of the modules and stores as well as the types of the ports and event sources/sinks. The application provides a complete logical representation of the service that will eventually be implemented at the Internet data center. The application may be stored on disk or some other form of computer-readable medium (block 612).

At block 614, the modeling system 512 converts the application to a physical blueprint that specifies the computers, the software run by each of the computers, and the interconnections among the computers. This physical blueprint may be used by the operator to install and manage the service afforded by the application.

Computer-Based Deployment System

Once a logical model is created, an automatic computer-based deployment system uses the logical model to deploy various computer/software resources to implement the application. The deployment system converts each of the model components into one or more instances that correspond to physical resources, such as nodes of a distributed computer system that are loaded with specific types of software to implement the function represented by the model components. The deployment system initially installs an application on the physical resources according to the logical model. It then dynamically and automatically modifies the resources used to implement the application in an ongoing basis as the operating parameters of the application change.

Figure 7:
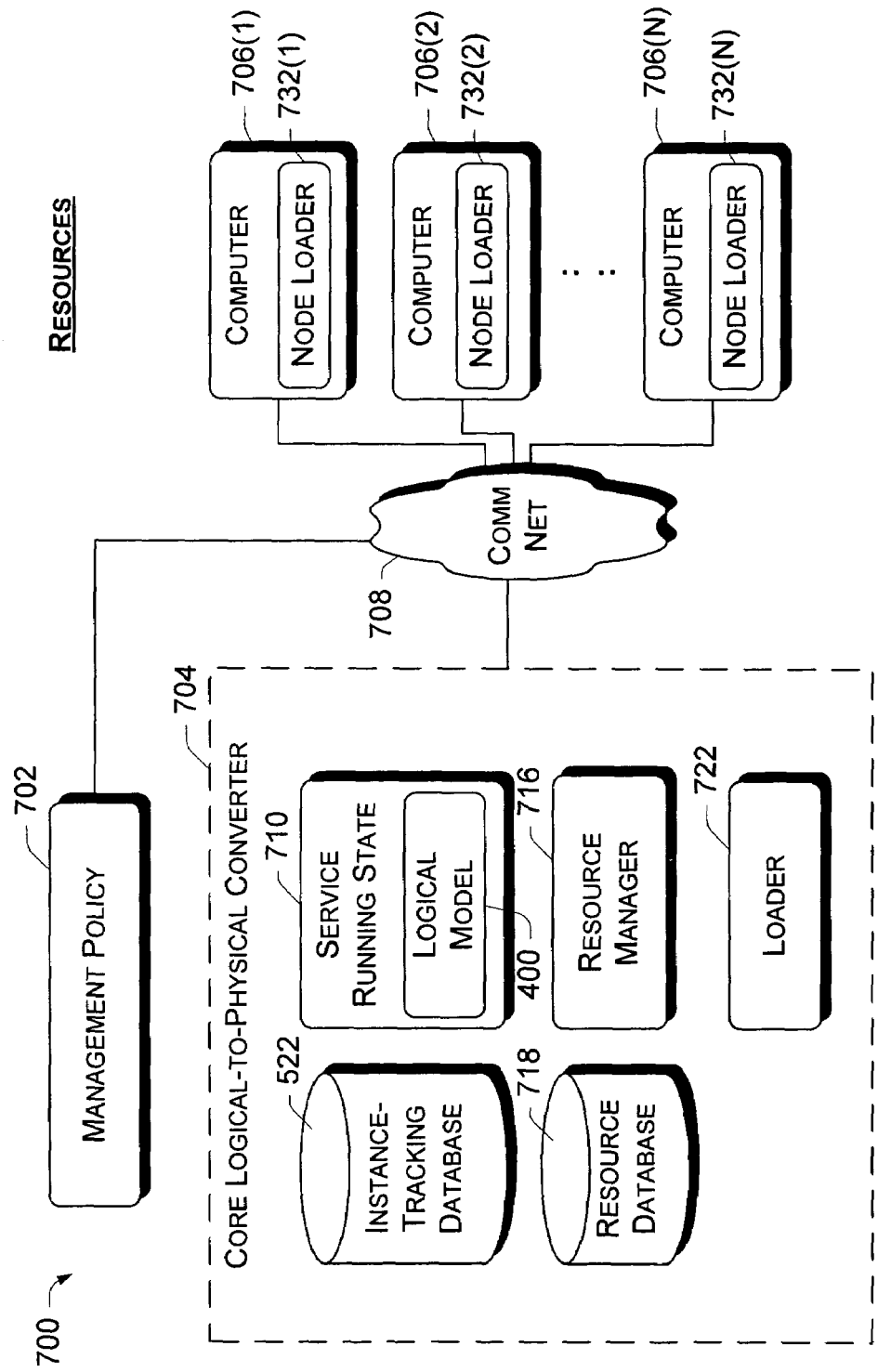
FIG. 7 is a block diagram of a deployment system that converts a logical model to a fully functioning physical implementation

FIG. 7 shows a deployment system 700 that converts the logical model to a fully functioning physical implementation. The deployment system 700 includes a policy module 702, a core runtime logical-to-physical converter 704, and hardware/software resources 706 that are all interconnected via a wireless and/or wire-based communication network 708 (e.g., a LAN, a WAN, intranet, Internet, combinations thereof, etc.). In this example, the hardware/software resources are illustrated as computer nodes of a distributed computer system, as represented by computers 706(1), 706(2), . . . , 706(N). The policy module 702 and core runtime converter 704 may be implemented on one or more computers, which may or may not be part of the nodes in the distributed computer system.

For purposes of discussion, the deployment system 700 is described in the context of an Internet service that is executed at an Internet data center having an abundance of generic computer nodes. The nodes can be allocated to one or more Internet services from a reserve pool of nodes, as illustrated in FIG. 1.

The policy module 702 implements one or more policies devised by the developer or operator of the Internet service. The policies specify when instances derived from the logical model should be created, manipulated, and destroyed. The policy module monitors various events generated by the nodes and implements policy decisions regarding how to handle the events. By specifying when and what instances should be created (or destroyed), the policy module 702 effectively dictates when hardware/software resources 706 should be added (or removed) to support the changing demands of the Internet service.

The core runtime converter 704 implements the policy decisions made by the policy module 702. The runtime converter 704 has a service running state 710 that tracks all instances of the model components currently in existence. That is, the service running state 710 tracks the elements in the physical world with respect to the logical model. The service running state 710 maintains a copy of the logical model, such as online retailing model 400 of FIG. 4. The logical model is created by the modeling system described above with respect to FIGS. 5 and 6. The current instances are maintained in a database 714. The records in instance database 714 include such information as identify of the instance, the name of the logical component from which it is derived, the node on which it is running, the network addresses representing the ports of the modules and stores, type of software loaded on the node, various protocols supported by the instance, and so forth.

The instances are derived from the logical model. The policy module 702 articulates the number of instances of each model component used to implement the Internet service at any given time. For instance, suppose the Internet service requires one hundred computers to effectively implement a front end that handles site traffic at 99.9% efficiency with each computer running at 70% utilization. The policy module might further specify that more computers should be added if some policy threshold is met (e.g., efficiency rating drops below some threshold or computer utilization rises above some threshold) or removed if another threshold is met.

A resource manager 716 tracks all of the physical resources available to the Website. These resources include computer nodes, storage, software, and so forth. Records identifying all of the resources are kept in the resource database 718. For instance, there might be one record for each computer node, storage device, and software module in the Internet data center. The records contain such information the identity of the allocated nodes, computing characteristics and capabilities, the application(s) to which they are allocated, the date and time of allocation, and so forth.

The resource manager 716 allocates the resources as needed or requested by the Internet service according to the policy implemented by the policy module 702. The allocation depends upon the availability of resources at the time of request. The resource manager 716 may also recover resources that are no longer needed by the Internet service and return the resources to the pool of available resources.

Upon allocation (or recovery) of a resource, the resource manager 716 post a record to the resource database 718 reflecting which resource is allocated to (or recovered from) which application. As an example, when an Internet service desires more nodes for the front end tasks, the resource manager 716 allocates one or more free nodes from the pool of resources to the Internet service.

Another unit, referred to as "new" 720, manages the creation of new instances in the physical world from the model components specified in the logical model 400. A loader 722 carries out the configuration of newly allocated resources to the functions dictated by the new instances. In this manner, when another instance of a component is desired, the new program 720 communicates with the resource manager 716 to allocate a node from the resource pool and with the loader 722 to load the appropriate software programs onto the node.

Each computer node 706(1)–706(N) has a policy engine 730(1)–730(N) and a node loader 732(1)–732(N). The policy engine 730 locally implements the policies dictated by the policy module 702. Depending upon the policies, the policy engine 730 monitors various parameters and performance metrics of the local node and generates events that may be sent to inform the policy module 702 as to how the node is operating within the policy framework.

For instance, suppose a policy specifies that nodes used to instantiate a particular module of the logical model should not operate at more than 80% utilization. The policy engine 730 enforces this policy by monitoring utilization. If utilization rises above 80%, the policy engine 730 sends an event to the policy module 702 to notify of the utilization increase. With this information, the policy module 702 may decide to create another instance of the module to relieve the over-utilized node.

The node loader 732 performs the actual loading tasks specified by the loader 722 in the core runtime converter 704. It is the local code on an otherwise generic node to which the runtime loader 722 may communicate when configuring the node.

FIG. 8 shows an example of a portion of logical model 400 being converted into actual instances. To illustrate the conversion, the front end module 402 and the order processing module 406 are extracted from the online retailer service application 400 (FIG. 4). A wire 442 interconnects the two modules by logically coupling the ports 422 and 440.

The front end module 402 in the logical model translates to one or more computer nodes in the physical world that runs software for handling client queries. These physical instances are represented diagrammatically by the rectangles with ovals. Here, based on a policy, the front end module 402 is converted into multiple front end instances 800(1), 800(2), 800(3), . . . , 800(J), which each corresponds in one-to-one fashion with a computer node loaded with software used to implement the front end of the service. The order processing module 406 translates to one or more computer nodes that run a program for processing client orders. In FIG. 8, the order processing module 406 is converted into plural order processing instances 802(1), 802(2), . . . , 802(K).

The ports 422 and 440 represent protocols and roles within protocols in the logical world. They translate to the physical world as a set of network addresses used to communicate with the software at the respective modules. For instance, the physical translation of a logical port might be IP Port 80, using HTTP (hypertext transport protocol). In FIG. 8, one logical port in the logical model is converted to a port address for each instance of the module. Logical port 422 converts into physical address ports 804(1)–804(J) and logical port 440 converts into physical ports 806(1)–806(K). Furthermore, the logical ports might correspond to particular objects and their interfaces. For example, port A might correspond to an object A and interface on a first computer, while port B might correspond to an object B and interface on a second computer.

The wire 442 represents logical connections between ports. It translates to a physical mesh of all possible communication paths between the instances of each module. The number of wires is determined as the cross product of the number of instances of each module. In FIG. 8, the wire 442 converts to a physical connection between every instance 800(1)–800(J) of the front end module 402 and every instance 802(1)–802(K) of the order processing module 406.

FIG. 9 illustrates exemplary records 900 in the instance database 714 that track the instances derived from the logical model 400. In this example, the database is a relational database that stores records in tables, and the records may be linked to one another via relationships. Here, there are three tables: a module table 902, a port table 904, and a wire table 906. Each table holds one record for a corresponding instance of the logical model. Each record has a number of fields relating to the type of information that is being tracked for each instance.

The module table 902 tracks instances of modules in the logical model. There is one record for each module instance. Thus, with respect to the front end module of FIG. 8, there are "J" records in the module table 902 corresponding to the "J" front end instances 800(1)–800(J). Each record in the module table 902 contains an instance ID to identify the individual instance, an identity of the module component from which the instance is derived, a node ID to identify the computer node to which the instance is associated, the type of software loaded on the node to implement the module functionality, a software ID, an identity of the various ports to the modules, and various protocols supported by the module instance. It is noted that other implementations may include additional fields or fewer fields than those illustrated.

The port table 904 tracks instances of the port in the logical model, such as ports 422 and 440 in FIG. 8. A record from this table includes such information as the port ID, the model component identity, a node ID, the network address represented by the port, the instance ID of the corresponding instance, the protocol used by the port, and an ID of the wire to which the port is connected. Again, more or less fields may be used in other implementations.

The wire table 906 tracks instances of the wires in the logical model, such as wire 442 in FIG. 8. A record in the wire table includes a wire ID, a model component identity, a node ID, a port ID, an instance ID, and the protocol supported by the wire.

Notice that the three tables can be correlated with one another via various relationships. For example, the module table 902 and the port table 904 are related by various data fields, such as the port ID field and the instance ID field. The wire table 906 correlates with the port table 904 via wire ID and port ID and with the module table 902 via instance ID. Notice also that the tables have a node ID field that provides a reference into the resource database by identifying which node the instance is associated with.

It is noted that the illustrated arrangement of the database is merely for discussion purposes. Many other table arrangements with more or fewer tables than illustrated.

Realtime Deployment Method

Figure 10:
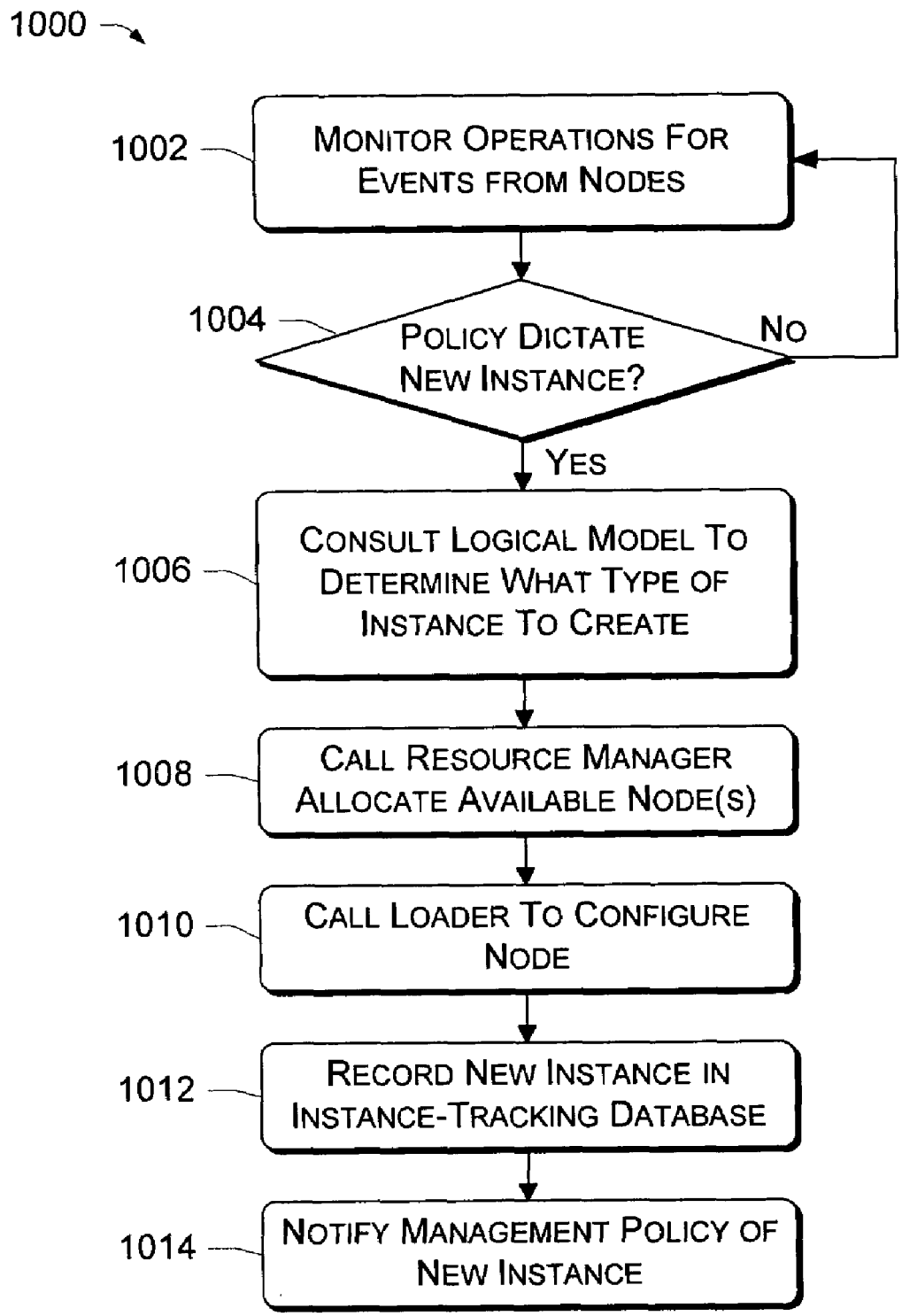
FIG. 10 is a flow diagram of a process for deploying resources for the application based on the logical model.

FIG. 10 shows a method 1000 for deploying resources for an application based on the logical model. The method 1000 is implemented by the deployment system 700 of FIG. 7 and hence can be embodied as software that, when executed on one or more computers, performs the operations illustrated as blocks in FIG. 12.

At block 1002, the policy module 702 monitors various operating parameters and listens for events from the policy engines 730 at the individual nodes 706. The policy module 702 evaluates the parameters and events against the policy backdrop to determine whether the current physical implementation is satisfactorily supporting the application, or whether a new instance of some component should be added (block 1004). It is noted that the continuing process is described in the context of adding a new instance. However, the policy may alternatively dictate that one or more instances should be removed. Removal of instances is somewhat easier in that instances are deleted from the instance database 714 and the computer nodes are returned to the additional pool for reallocation.

Assuming that a new instance is desired (i.e., the "yes" branch from block 1004), the policy module 702 consults the service running state 710 to understand the current number and arrangement of instances (block 1006). The policy module 702 can request various types of information of the service running state 710, such as:

How many instances of a given module?

What nodes are associated with a given model component?

Which nodes are attached to a given wire?

What is the network address of a node?

What wire is attached to a port on a given component?

What components does a given component own?

Depending upon the event or operating condition, the policy module 702 can request information on a particular module in the logical model 400. For example, assume that an event has been received from a front end node indicating that the utilization has risen to above 90%. In response, a policy specifying the addition of another instance at such utilization levels is triggered. The policy module 702 asks the service running state 710 how many instances of the front end module currently exist, and information regarding how to specify an instance for the front end module.

At block 1008, the policy module 702 calls the program "new" 720 to create a new instance of a module in the logical model. At block 1010, the new program 720 calls the resource manager 716 to request allocation of a new node (assuming one is available). The resource manager 716 examines the resources using data from the resource database 718 and allocates a new node that is currently available from a pool of free nodes. The resource manager 716 records the allocation in the resource database 718, identifying which node is allocated, what application it is being allocated to, the date and time that it is allocated, and so forth.

At block 1012, the new program 720 calls the loader 722 to install software onto the allocated node and configure the node to perform the functions represented by the logical module from which the instance is created. In response, the loader 722 initializes the node by communicating with the node loader 730 of the new node via the network 708 to install an image of an operating system (e.g., Windows NT server operating system from Microsoft Corporation). The loader 722 then loads the appropriate software and configures the node to perform the functions represented by the logical model component from which the instance is derived. For example, for an instance of an SQL module in the logical model 400, the node loader 732 loads SQL server software. The loader 722 registers the physical port addresses with the service running state 710, which records the new instance in the instances database 714.

At block 1014, the service running state 710 is notified when the newly allocated and configured node is up and running. The service running state 710 records a new instance of the logical model in the instances database 714. The record reflects an ID of the instance, the name of the logical component from which it is derived, the allocated node, the network addresses of the node, software type and IDs, various protocols supported by the instance, and so on.

At block 1016, the policy module 702 is notified by the core runtime converter 704 that a new instance is up and running. The new instance should relieve the event or operating condition to bring operation back into compliance with the policy.

Policy Enforcement Mechanism

Figure 11:
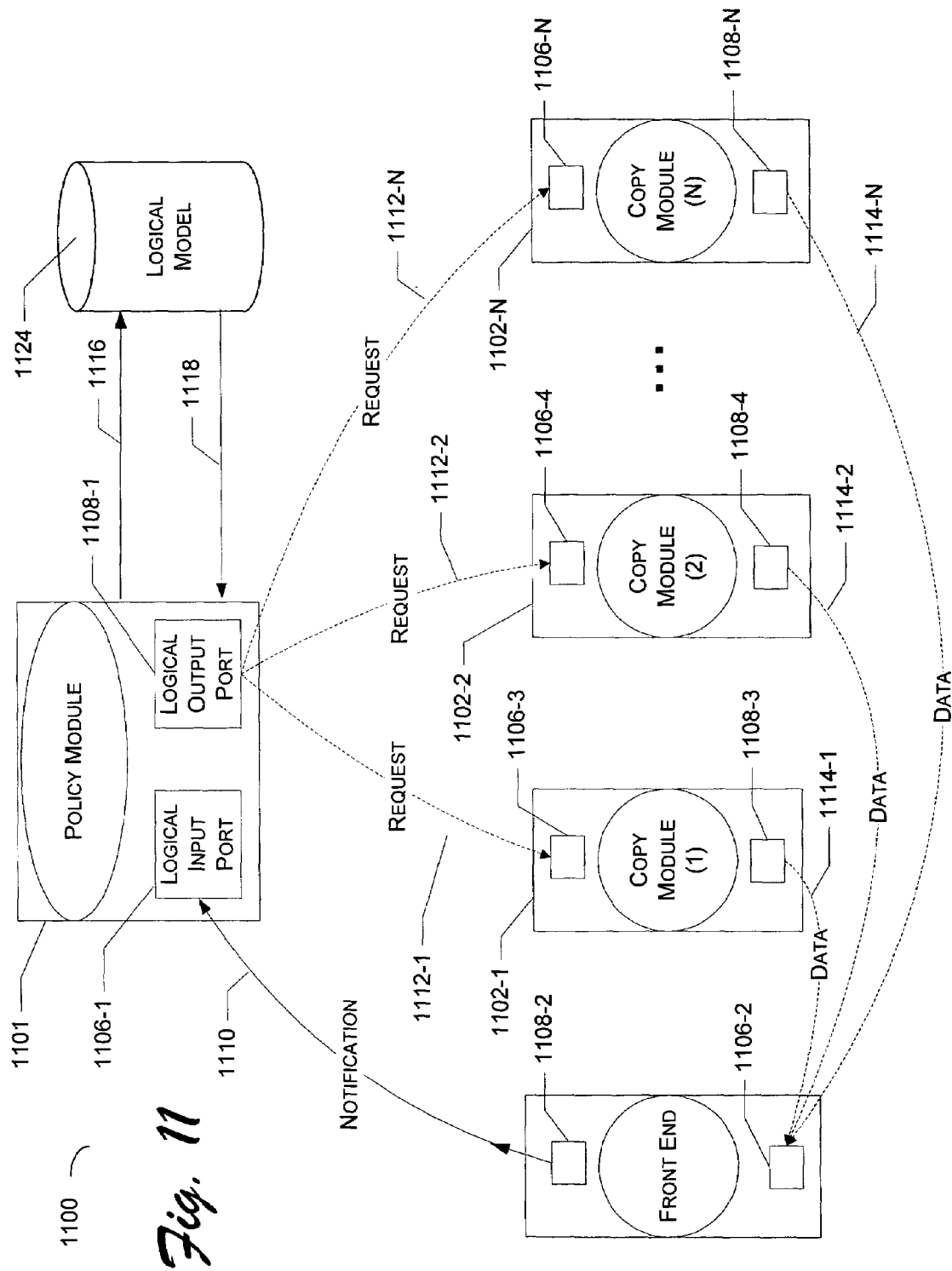
FIG. 11 illustrates a system providing automatic policy enforcement in a multi-computer application.

FIG. 11 illustrates a system 1100 to enforce policy in a multi-computer service application having a plurality of software programs that execute on a plurality of computers. The service application includes a communications medium that allows data communications between different ones of the computers. In this example, the application is a distributed copying service, where copy modules 1102 send electronic documents to front ends 1104.

The application is designed and implemented using the modeling system and deployment system discussed above. The model components of the application include the logical counterparts of the policy module 1101, one or more copy modules 1102, and one or more front ends 1104. The modeling system allows the model components to be arranged and interconnected to form a scale-independent model of the application. The deployment system converts each of the model components into one or more instances that correspond to physical resources. In this example, the physical instances of the system's model components are represented diagrammatically by rectangles with ovals.

Each module includes respective logical input ports 1106 and logical output ports 1108. The logical input ports 1106 and logical output ports 1108 are configured on different modules in accordance with a logical model 1124 of the distributed copying service. Each logical input and output port is defined by port software.

Logical wires or data connections are configured between the logical output and input ports in accordance with the logical model. For example, data flow arrows 1110, 1112, and 1114 represent logical data connections. Each module can include other communication paths other than those represented by the data flow arrows. Upon each module's instantiation, each respective port is configured to communicate through different numbers of logical data connections without modifying the port software.

The policy module 1101 implements one or more policies devised by the developer or operator of the service application. The policy module monitors various events generated by the computer nodes and implements policy decisions regarding how to handle the events. In this example, the front end module 1104 represents a newly instantiated module that is ready to receive electronic data from copy modules 1102. The front end module provides a notification 1110 to output port 1108-2, which is configured according to the configured logical data connections to send the notification to the policy module's input port 1106-1. The policy module accepts the notification and in response, formulates a request for one or more destination modules. As noted above, such a request includes, data or notifications.

The request is provided to the output port 1108-1 of the policy module. The output port forwards the request 1112 to respective input ports 1106 of one or more copy modules in accordance with the configured logical data connections. In this example, the request notifies the copy modules that they can begin sending data to the newly instantiated front end module.

In response to receiving the request, the respective output ports 1108-3 through 1108-N are reconfigured, during runtime, according to the logical connections 1114 described in the logical model to send data to the new front end.

In this manner, the policy enforcement system changes distributed application management from a manual process requiring human intervention and control, to an automatic process. With conventional management procedures, a sending module would have had to have been recoded with the new addresses of any added components. With the new automatic policy enforcement, scale-invariant policies can be developed that do not require constant human intervention and control to respond to changes in application operation.

Figure 12:
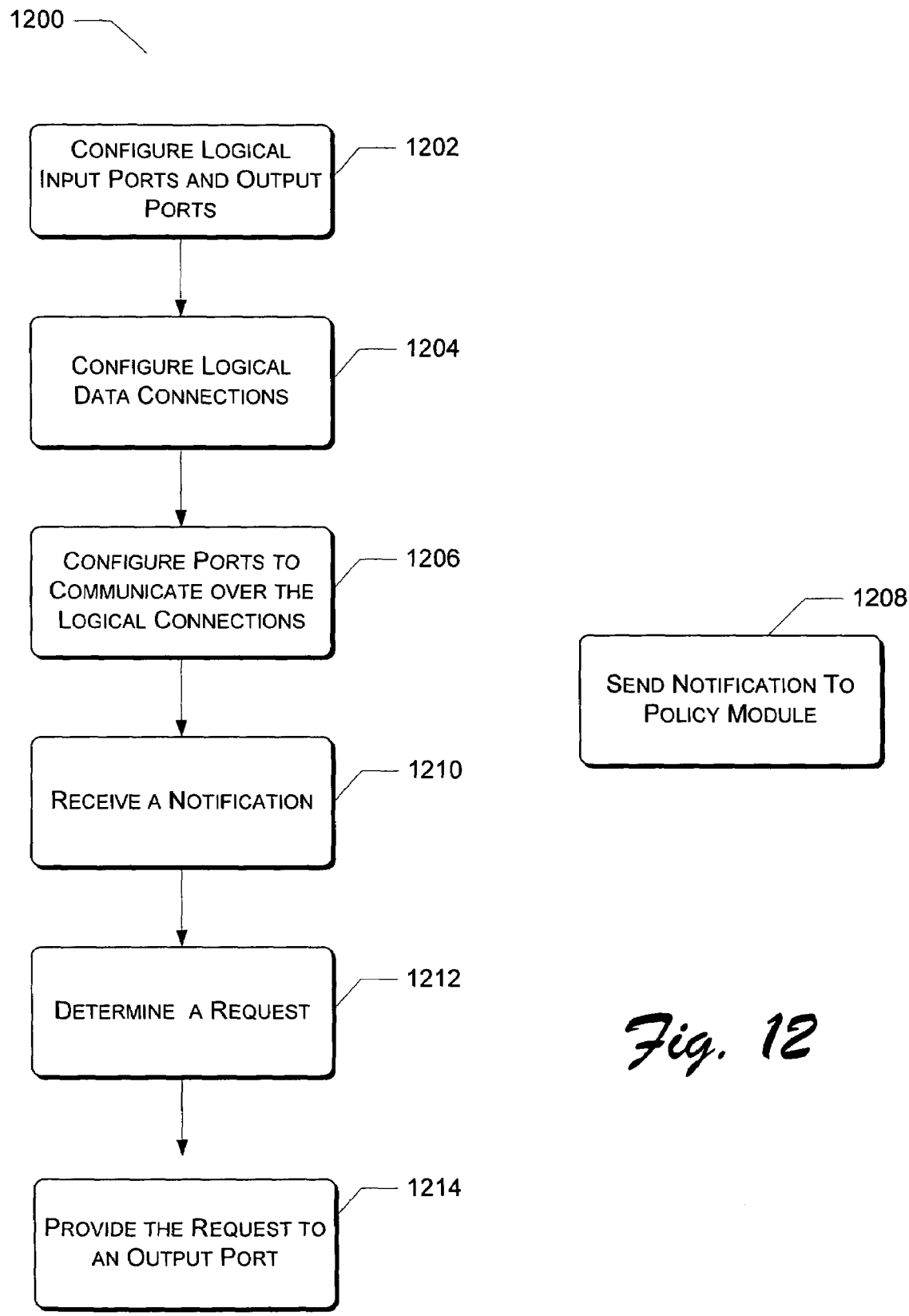
FIG. 12 illustrates a procedure that provides automatic policy enforcement in a multi-computer application.

FIG. 12 illustrates an exemplary procedure 1200 to automate policy enforcement in a multiple-computer application. At step 1202, the procedure configures logical output ports and logical input ports on different modules according to a logical model (logical model) of the multi-computer service application. Each logical input and output port is defined by port software.

At step 1204, the procedure configures logical data connections between the logical output and input ports according to the logical model. At step 1206, the procedure configures each port to communicate through different numbers of logical data connections. This is done without modifying the port software.

At step 1208, upon occurrence of a condition, the procedure sends a notification from a particular module to a policy module. At step 1210, the policy module receives the notification. At step 1212, the policy module responds to the notification by determining a request for one or more destination modules. This request is determined based on a policy developed by the designer of the application. At step 1214, the policy module provides the request to an output port of the policy module to forward the request to input ports of multiple modules according to the configured logical data connections. In this way, the response to the notification is automatically forwarded to the proper modules without a need to determine who or where those modules are.

Conclusion

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A computer-implemented method of enforcing policy in a multi-computer service application, the method comprising:

monitoring, by a policy module, operation of an application during runtime, the application comprising multiple software modules configured to execute on respective ones of multiple computers, the software modules being defined by logical input and output ports and logical data connections between respective ones of the software modules;

receiving, by the policy module, a notification from one of the software modules indicating a change in operation of the application;

responsive to receiving the notification, enforcing, by the policy module, a policy associated with the application by:

(a) evaluating content of the notification against the policy to generate a response for one or more destination modules of the application, the evaluating comprising determining, by the policy module, the one or more destination modules by identifying a number of instances of each software or hardware module used to implement multi-computer service application at any given time based on the policy; and (b) forwarding, by an output port of the policy module, the response to input ports of the one or more destination modules in accordance with the logical data connections associated with the one or more destination modules; and wherein the policy is abstracted from physical deployment of the multi-computer service application.

2. The method of claim 1, further comprising configuring an input port of the respective one of the software modules as a function of an associated one of the logical input ports.

3. The method of claim 1, further comprising configuring a particular output port of the output ports during run-time to specify different logical data connections, the particular output port being configured as a function of a logical model of the multi-computer service application.

4. The method of claim 1, further comprising configuring an output port of the output ports during instantiation of the respective one of the software modules to specify different logical data connections.

5. The method of claim 1, further comprising:
   implementing port software based on respective ones of the logical input and output ports; and
   configuring a communication route between a first portion of the port software and a second portion of the port software, the first portion being associated with a physical input port resource, the second portion being associated with a physical output port resource.

6. The method of claim 5, further comprising configuring the physical input port resource to communicate with the physical output port resource via the communication route.

7. The method of claim 1, and further comprising generating a logical model of the application, the logical module comprising model components, each model component representing an abstract operation of the multi-computer service application, the model components representing respective hardware and software modules.

8. The method of claim 7, wherein a blueprint specifies the hardware and software modules represented by the model components.

9. The method of claim 1,
   wherein the response specifies one or more actions for deploying a new resource represented by a model component in the logical model, manipulating a module in multi-service computer application by sending events to the module, or removing a module from the multi-service computer application.

10. The method of claim 9, wherein deploying the new resource comprises:
    creating a physical instance of a model component representing the new resource; and
    configuring logical input and output port(s) for the newly deployed resource in accordance with logical connections specified in the logical model.

11. A computer-readable storage medium comprising computer-executable instructions for enforcing policy in a multi-computer service application, the computer-executable instructions comprising instructions for:
    detecting, by a particular module of a multi-computer service application, a change in operating conditions;
    responsive to the detecting:
       sending, by the particular module, a notification corresponding to the change to a policy module, the particular module and the policy module being respective ones of multiple software modules configured to execute on respective ones of multiple computers, the software modules including logical input and output ports and logical data connections between respective ones of the software modules, each logical port being defined by port software, the notification for evaluation, by the policy module, against a policy that is abstracted from physical deployment of the multi-computer service application, the policy defining a definite course of action selected from among alternatives in light of monitored conditions to perform one or more of:
       (a) installing, configuring, or removing components of the multi-computer service application; and
       (b) implementing measures to maintain proper operation of the components and the multi-computer service application as a whole; and
    receiving, by the particular module, a response from the policy module, the response directing the particular module to implement at least one aspect of the policy.

12. The computer-readable storage medium of claim 11, further comprising computer-executable instructions responsive to receiving the response, for configuring, by the particular module, an input port according to the policy.

13. The computer-readable storage medium of claim 11, further comprising computer-executable instructions responsive to receiving the response, for configuring, by the particular module, an output port to specify different logical data connections according to the policy.

14. The computer-readable storage medium of claim 11, further comprising computer-executable instructions for:
    in accordance with the response, the particular module:
       implementing port software based on respective ones of logical input and output ports specified by the policy; and
       configuring a communication route between the port software and a physical output or input port resource of a different component of the multi-computer service application.

15. The computer-readable storage medium of claim 11, wherein the multi-computer service application was automatically deployed based on a logical model comprising model components, each model component representing an abstract operation of the multi-computer service application, the model components representing respective hardware and software modules.

16. A computing device comprising:
    a processor; and
    a memory coupled to the processor, the memory comprising computer-program instructions executable by the processor, the computer-program instructions comprising instructions for:
       detecting, by a particular module of a multi-computer service application, a change in operating conditions;
       sending, by the particular module, a notification corresponding to the change to a policy module of the multi-computer service application, the particular module and the policy module being respective ones of multiple software modules configured to execute on respective ones of multiple computers, the software modules including logical input and output ports and logical data connections between respective ones of the software modules, each logical port being defined by port software;
    responsive to receiving the notification, the policy module:
       evaluating the change against a policy for the multi-computer service application, the policy being abstracted from the physical deployment of the multi-computer service application, the policy defining a definite course of action selected from among alternatives in light of monitored conditions to perform one or more of:
  (a) installing, configuring, or removing components of the multi-computer service application; and
  (b) implementing measures to maintain proper operation of the components and the multi-computer service application as a whole; and
communicating, by the policy module, a response directing the particular module to implement at least one aspect of the policy.

17. The computer-readable medium of claim 16, wherein the response directs the particular module to configure an input port or an output port.

18. The computer-readable medium of claim 16, wherein the policy directed automated deployment of at least a portion of the multi-computer service application using a logical model comprising model components, each model component representing an abstract operation of the multi-computer service application, the model components representing respective hardware and software modules.

19. The computer-readable medium of claim 16, wherein the response causes:
  port software to be implemented according to logical input and output ports specified in the logical model; and
  a communication route to be configured between a first portion of the port software and a second portion of the port software, the first portion being associated with a physical input or output port resource, the second portion being associated with a respective physical output or input port resource.

20. The computer-readable medium of claim 16, wherein the instructions for evaluating the change further comprise computer-program instructions for determining a number of instances of each software or hardware module used to implement the multi-computer service application at any given time based on the policy.

21. A computing device comprising:
  sending means for sending a notification from a particular module to a policy module, the particular module and the policy module being respective ones of multiple software modules configured to execute on respective ones of multiple computers, the multiple software modules including logical input and output ports and logical data connections between respective ones of the software modules, each logical port being defined by port software;
  determining means, responsive to the notification, for the policy module to determine a request for one or more destination modules, the request being based on a policy that is abstracted from the physical deployment of the multiple software modules; providing means for the policy module to provide the request to an output port of the policy module; and
  forwarding means for the policy module to forward the request from the output port to respective input ports of the one or more destination modules in accordance with the logical data connections.

* * * * *